US012665765B2

(12) United States Patent
Chen et al.

(10) Patent No.: US 12,665,765 B2
(45) Date of Patent: Jun. 23, 2026

(54) METHODS, DEVICES, AND COMPUTER PROGRAM PRODUCTS FOR VERIFYING IOT DEVICE

(71) Applicant: Dell Products L.P., Round Rock, TX (US)

(72) Inventors: Tianxiang Chen, Shanghai (CN); Jinpeng Liu, Shanghai (CN); Wenqing Peng, Dezhou (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/679,602

(22) Filed: May 31, 2024

(65) Prior Publication Data

US 2025/0330326 A1 Oct. 23, 2025

(30) Foreign Application Priority Data

Apr. 19, 2024 (CN) ......................... 202410479423.X

(51) Int. Cl.
*H04L 9/32* (2006.01)
(52) U.S. Cl.
CPC .................................. *H04L 9/3234* (2013.01)
(58) Field of Classification Search
CPC ... H04L 9/3234; H04L 9/3236; H04L 9/3247; H04L 9/3263; G06F 21/572; G06F 21/606
See application file for complete search history.

(56) References Cited

U.S. PATENT DOCUMENTS

2008/0244569 A1* 10/2008 Challener ........... G06F 9/45558
718/1
2017/0250892 A1* 8/2017 Cooper ................. G06F 21/552
2019/0109877 A1* 4/2019 Samuel ................... H04W 4/70
(Continued)

OTHER PUBLICATIONS

I-Scoop, "Secure and Zero-touch IoT Device Onboarding at Scale: Intel SDO," https://www.i-scoop.eu/iot-intel-sdo-secure-device-onboarding/, Accessed Jan. 18, 2024, 5 pages.
(Continued)

*Primary Examiner* — Hyun Soo Kim
(74) *Attorney, Agent, or Firm* — Ryan, Mason & Lewis, LLP

(57) ABSTRACT

Embodiments of the present disclosure include a method, a device, and a computer program product for verifying an Internet of Things (IoT) device. The method includes, in response to boot of a trusted platform module (TPM) simulator, establishing an environment similar to the TPM in a trusted execution environment (TEE) of the IoT device. The method further includes sending, by a direct anonymous attestation (DAA) simulator in the TEE, an access request to an application in the IoT device. In addition, the method further includes, in response to receiving a response received by the application from a cloud platform, executing, by the TPM simulator, verification for the IoT device. In some embodiments, required TPM security services are simulated in the TEE of IoT devices, thereby minimizing the exposure of user privacy information while completing the verification and ensuring the security of verification.

20 Claims, 7 Drawing Sheets

(56)     References Cited

U.S. PATENT DOCUMENTS

| | | | | |
|---|---|---|---|---|
| 2019/0349426 | A1* | 11/2019 | Smith | H04L 63/123 |
| 2022/0171883 | A1* | 6/2022 | Bursell | G06F 21/71 |
| 2024/0419802 | A1* | 12/2024 | Edwards | G06F 21/575 |
| 2025/0233740 | A1* | 7/2025 | Sinha | H04L 9/088 |

OTHER PUBLICATIONS

Fido Alliance, "Device Onboarding Overview," https://fidoalliance.org/device-onboarding-overview/, Accessed Jan. 18, 2024, 2 pages.
G. Cooper, "Learnings from SDO & FIDO Alliance IoT TWG Protocols," https://www.nccoe.nist.gov/sites/default/files/2021-10/08-2020-10%20Geoffrey%20Cooper%20--%20Learnings%20from%20SDO%20and%20FIDO%20IOT%20TWG%20%28NCCOE%20virtual%20workshop%29.pdf, Accessed Jan. 18, 2024, 10 pages.

* cited by examiner

100

400

402

In response to boot of a TPM simulator, establish an environment similar to the TPM in a TEE of an IoT device

404

Send, by a DAA simulator in the TEE, an access request to an application in the IoT device

406

In response to receiving a response received by the application from a cloud platform, execute, by the TPM simulator, verification for the IoT device

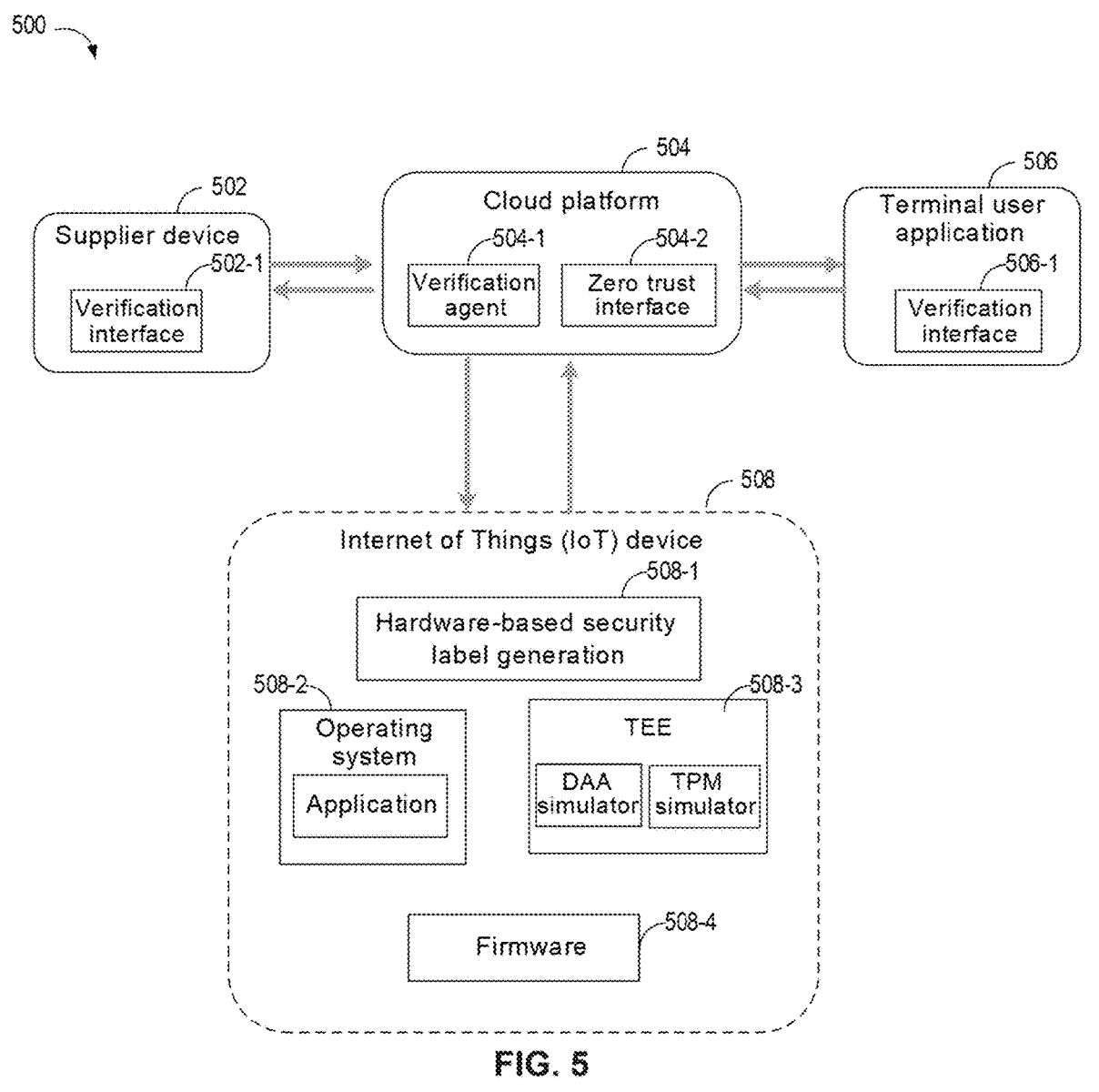

500

Supplier device ~502

Verification interface ~502-1

Cloud platform ~504

Verification agent ~504-1

Zero trust interface ~504-2

Terminal user application ~506

Verification interface ~506-1

Internet of Things (IoT) device ~508

Hardware-based security label generation ~508-1

Operating system ~508-2

Application

TEE ~508-3

DAA simulator

TPM simulator

Firmware ~508-4

FIG. 5

METHODS, DEVICES, AND COMPUTER PROGRAM PRODUCTS FOR VERIFYING IOT DEVICE

RELATED APPLICATION

The present application claims priority to Chinese Patent Application No. 202410479423.X, filed Apr. 19, 2024, and entitled "Methods, Devices, and Computer Program Products for Verifying IoT Device," which is incorporated by reference herein in its entirety.

FIELD

The present disclosure relates to the field of Internet of Things (IoT) devices, and more specifically, relates to a method, a device, and a computer program product for verifying an IoT device.

BACKGROUND

When performing operations such as deploying an IoT device, installing an IoT device, upgrading firmware of an IoT device, and/or other operations that may be performed on or otherwise involve an IoT device, corresponding secure verification is typically carried out to ensure the device's version and hardware information, and whether there are security vulnerabilities (e.g., whether hardware level code is tampered with), as well as whether it is a real device (e.g., not a forged fake device).

In order to complete such verification, a large amount of information about the IoT device is usually sent to a supplier of a security chip the IoT device is equipped with. For a device purchaser, there is a risk of privacy information leakage during this verification process, which may expose its own business plans and business secrets.

SUMMARY

Embodiments of the present disclosure provide a method, a device, and a computer program product for verifying an IoT device.

According to a first aspect of embodiments of the present disclosure, a method for verifying an IoT device is provided, including: in response to boot of a trusted platform module (TPM) simulator, establishing an environment similar to the TPM in a trusted execution environment (TEE) of the IoT device; sending, by a direct anonymous attestation (DAA) simulator in the TEE, an access request to an application in the IoT device; and in response to receiving a response received by the application from a cloud platform, executing, by the TPM simulator, verification for the IoT device.

According to a second aspect of embodiments of the present disclosure, an electronic device is provided and includes at least one processor and a memory coupled to the at least one processor and having instructions stored therein, wherein the instructions, when executed by the at least one processor, cause the electronic device to perform actions including: in response to boot of a TPM simulator, establishing an environment similar to the TPM in a TEE of the IoT device; sending, by a DAA simulator in the TEE, an access request to an application in the IoT device; and in response to receiving a response received by the application from a cloud platform, executing, by the TPM simulator, verification for the IoT device.

According to a third aspect of embodiments of the present application, a computer program product is provided, which is tangibly stored on a non-transitory computer-readable medium and includes machine-executable instructions, where the machine-executable instructions, when executed by a machine, cause the machine to perform actions including: in response to boot of a TPM simulator, establishing an environment similar to the TPM in a TEE of the IoT device; sending, by a DAA simulator in the TEE, an access request to an application in the IoT device; and in response to receiving a response received by the application from a cloud platform, executing, by the TPM simulator, verification for the IoT device.

It should be understood that the content described in this Summary is neither intended to define key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, the same or similar reference numerals represent the same or similar elements. In the accompanying drawings:

FIG. 5 shows a schematic diagram of a first verification process for an IoT device according to some embodiments of the present disclosure;

DETAILED DESCRIPTION

Figure 1:
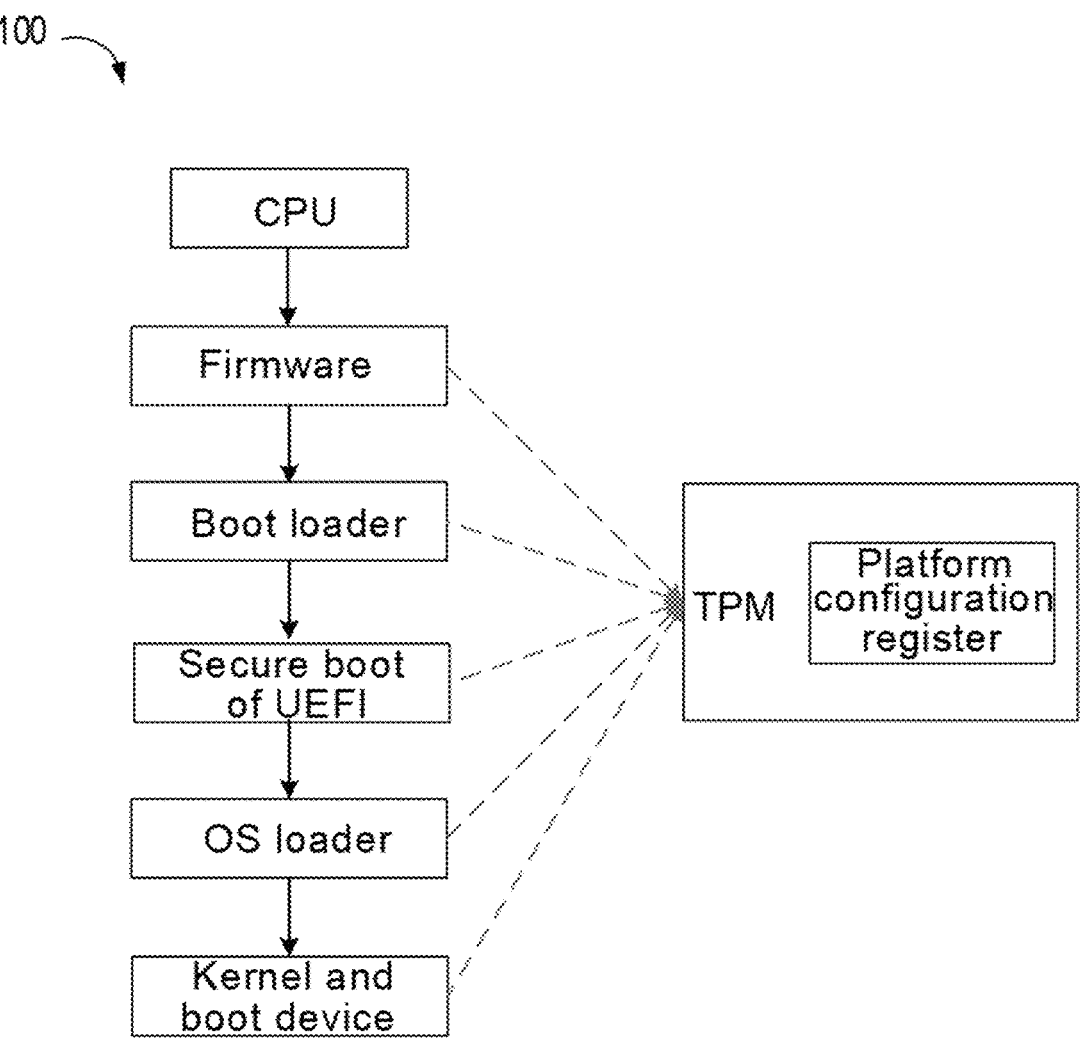
FIG. 1 is a schematic diagram of a trust chain of a boot process of a device equipped with a TPM chip.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the terms "include," "have," and similar terms should be understood as open-ended inclusion, that is, "including but not limited to." The term "based on" should be understood as "based at least in part on." The terms "embodiment," "one embodiment," or "this embodiment" should be understood as "at least one embodiment."

During a security verification process for an IoT device, a large amount of information about the device is usually sent to a supplier (verifier) of a security chip the device is equipped with. With such information, the verifier can clearly identify detailed information of the device being verified, thereby obtaining information about the device and the device purchaser, and such information may be privacy information of a user.

At present, mainstream IoT devices use TPM chips for security verification, which are chips implanted inside a computer to provide a root of trust for the computer. Specifications of the chip are developed by a trusted computing group. Although TPM chips can perform a wide range of encryption, they are not commonly used in many IoT devices due to limitations in space, cost, and power consumption. In fact, ARM chipsets are currently commonly used in IoT devices. The ARM TrustZone provides a runtime environment that is isolated from other software on the platform (including an operating system, applications, and most firmware), making it possible to implement security services that provide security guarantees similar to the TPM and other security coprocessors.

On the other hand, the current security verification for the IoT devices is software based, without hardware-based certificates, security labels, or trusted tokens. If the firmware and/or the applications of the IoT devices are destroyed, software-based secure verification methods may be tampered with. In addition, since the IoT devices are usually placed in relatively insecure environments (public areas, outdoor areas, etc., compared with servers in computer rooms), they are more easily accessible to hackers. Not only the hardware of the devices and the underlying layer (a device code provided by a device manufacturer at the factory), but also the application designed at a user level, have the risk of being attacked and modified.

Illustrative embodiments of the present disclosure provide techniques for verifying an IoT device. In some embodiments of the present disclosure, by simulating required TPM security services in a TEE of an IoT device, verification is completed while minimizing the exposure of user privacy information, and a verification protection approach is provided for application codes at a user application layer.

FIG. 1 is a schematic diagram of a trust chain 100 of a boot process of a device equipped with a TPM chip. As shown in FIG. 1, the trust chain 100 is established by verifying each hardware and software component from a terminal entity to a root certificate. In some embodiments, the trust chain 100 aims to ensure that only trusted software and hardware are used. In the device boot process shown in FIG. 1, security verification is performed on each component, illustratively comprising firmware, boot loader, secure boot of Unified Extensible Firmware Interface (UEFI), operating system (OS) loader, kernel and boot device. Such verification has a sequential relationship, that is, the verification for the next component is based on a combination of its own digital signature and digital signatures of all previously verified components. As shown in FIG. 1, a digital signature of firmware will first be verified through the TPM so as to reduce risks of firmware rootkits. Then, for all codes running before the operating system, the digital signature of a loader is checked through the TPM to ensure that these codes are trustworthy. Next, a trusted boot program runs and verifies the digital signatures of the kernel and boot devices (including boot processes, guide drivers, and boot files).

During the device boot process, the hash of a binary file is extended to a platform configuration register (PCR). The extension corresponds to the hash of a connection between the previous content of the PCR and the input hash, and the result is stored in the PCR. The device boot process defines a boot sequence (trust chain) that prevents unauthorized or modified code from running during the boot process. In this process, the TPM acts as the trust root of the platform, securely storing key materials and platform measurement values, thereby protecting hardware security and ensuring platform trustworthiness.

Figure 2:
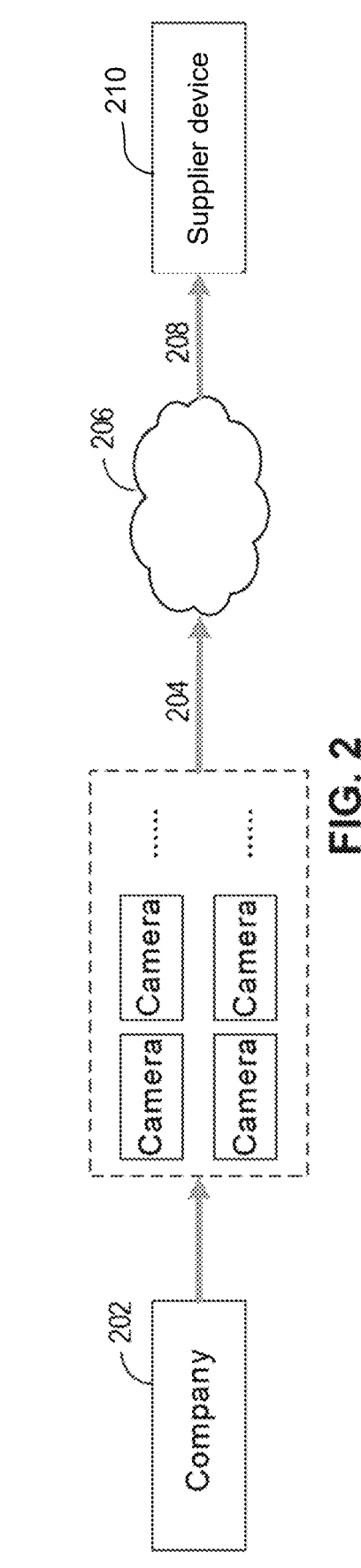
FIG. 2 shows a schematic diagram of a current IoT device verification process.

FIG. 2 shows a schematic diagram of a current IoT device verification process 200. As shown in FIG. 2, a large number of cameras are installed in a company 202. When these cameras are configured and a secure verification process is performed on these cameras, information used for configuration and verification is first sent to a cloud platform 206 in a process 204, and such information includes specific device information, network addresses, actual geographical locations of deployment, and the scale and quantity of deployed devices. Subsequently, the cloud platform 206 sends such information to a supplier device 210 during a process 208. Due to the fact that the current IoT device verification process 200 is totally controlled and managed by the supplier device 210, it may lead to leakage of customer privacy data. For example, the company 202 purchases a large number of monitoring cameras and these devices are deployed to a region. Every time a device is installed or secure verification is performed, the supplier device will obtain detailed information of the device's digital/geographic data. Such information is highly sensitive and may leak the company's business secrets.

Figure 3:
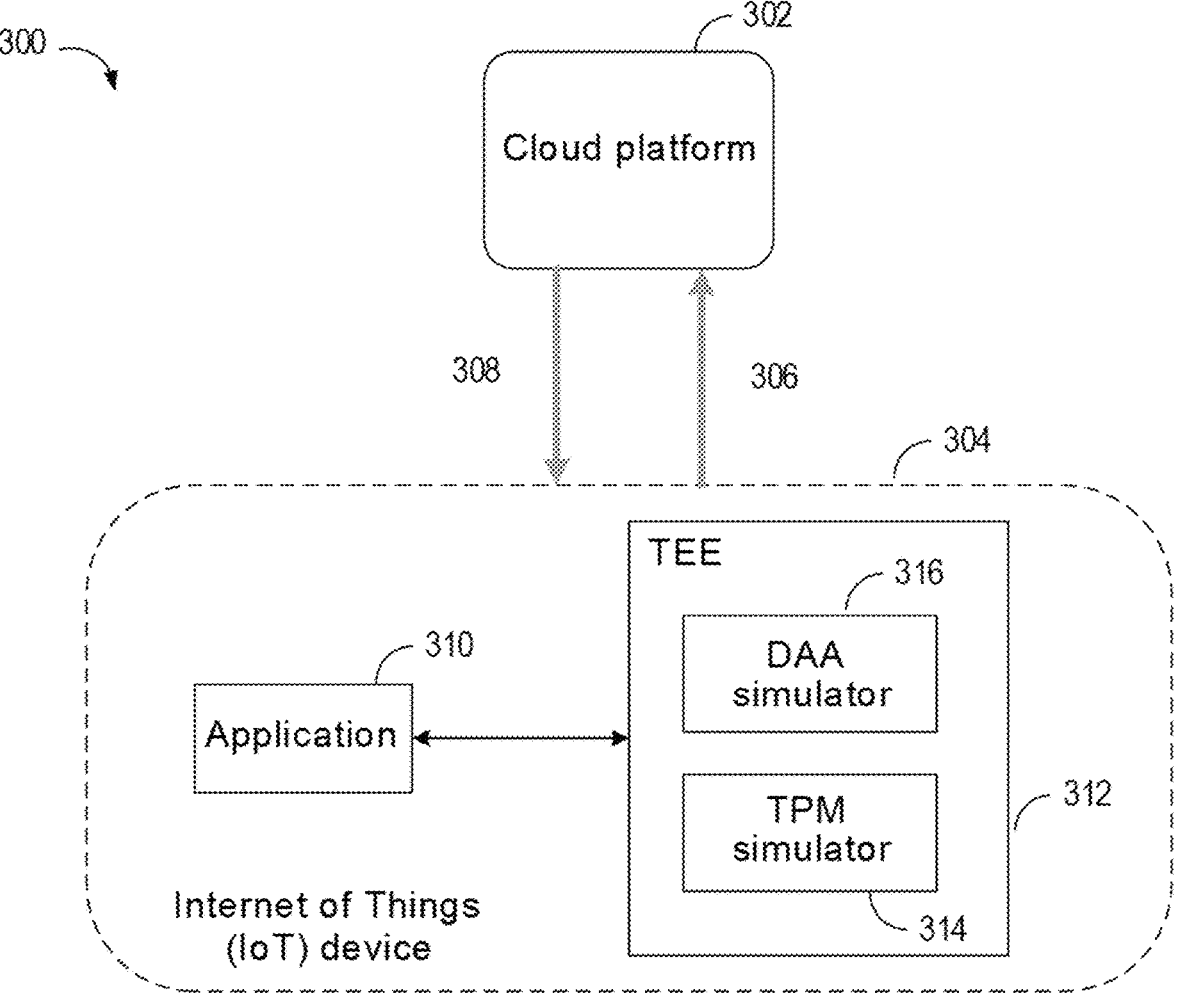
FIG. 3 shows a schematic diagram of an environment used for implementing some embodiments of the present disclosure.

FIG. 3 shows a schematic diagram of an environment 300 used for implementing some embodiments of the present disclosure. In FIG. 3, the environment 300 includes a cloud platform 302 and an IoT device 304, with the cloud platform 302 and the IoT device 304 interacting with one another as illustrated at 306 and 308. The cloud platform is composed of operating systems and hardware of servers in a data center. After being configured, they can provide cloud computing services for customers, allowing enterprises to rent access to computing resources on demand through the Internet. The IoT device 304 is a non-standard computing device that can connect in a wireless or wired manner to a network and has the ability of transmitting data. The IoT device 304 includes an application 310 and a TEE 312 running internally, where the TEE 312 includes a TPM simulator 314 and a DAA simulator 316.

The IoT device 304 can be divided into wired IoT devices and wireless IoT devices according to different network connection methods. The wired IoT devices typically refer to devices that connect to a network through network cables or Ethernet, commonly seen in industrial and commercial fields such as gateways, exchanges, industrial robots, surveillance cameras, etc. The wireless IoT devices refer to devices that connect to a network through 4G, WIFI, Bluetooth, etc., and have applications in various fields such as home, industry, and business, for example, industrial gateways, smart speakers, and smart homes.

Functions of the IoT device 304 include at least a subset of: 1) data collection and transmission: environmental data is collected through sensors and sent to the cloud or other devices through IoT technologies; 2) online monitoring and location tracing: monitor the running status of the device and achieve device positioning and tracking through wireless communication technologies, GPS systems, etc.; 3) remote control and operation: IoT devices can be remotely controlled and operated through IoT technologies; 4) data processing and analysis: IoT devices can process and analyze collected data, providing real-time information and feedback; 5) automation and intelligence: IoT devices can achieve automation control, upgrading, and intelligent applications through intelligent algorithms and control systems.

The TEE 312 in the IoT device 304 is a separate region on a CPU processor, and is separated from other parts of the CPU by using an encryption technology. This region can only be accessed and used for computation through a TEE service interface provided by the processor's manufacturer itself and only after a series of verifications. The TEE 312 runs on top of a regular operating system and can operate on data within the TEE 312 through appropriately authorized code. As it provides a trusted secure operating environment, any data within it cannot be read or tampered with by any code outside of the environment, ensuring security and privacy of sensitive data and code.

The TPM simulator 314 in the TEE 312 is a simulated implementation of the TPM. The TPM is a computer chip (e.g., microcontroller) that can securely store components used to verify platforms (e.g., IoT devices, computers, and laptops). These components can include passwords, certificates, or encrypted keys. The TPM can also be used to store platform measurement values that help ensure that the platform remains trustworthy. Devices containing TPMs can create encrypted keys and encrypt them so that these keys can only be decrypted by the TPM. Each TPM has a main package key, called a storage root key, which is stored in the TPM itself. The private part of the storage root key created in the TPM will never be exposed to any other component, software, process, or user. It can be specified whether the encrypted key created by the TPM can be migrated. If it is specified that the key can be migrated, the public and private parts of the key can be made public to other components, software, processes, or users. Devices containing the TPM can also create a key that has been packaged and bound to certain platform metrics. Only when these platform metrics have the same value as when the key was created can this type of key be unpacked. This process is called "sealing" the TPM's key, and decrypting the key is called "unsealing." The TPM can also seal and unseal data generated externally to the TPM. The sealed key and software can be used to lock data. The TPM uses its own internal firmware and logic circuits to process instructions. Therefore, it does not rely on the operating system and will not be exposed to potential vulnerabilities in the operating system or the application software. In some embodiments of the present disclosure, the TPM simulator 314 can implement the characteristics of the TPM, which include but are not limited to the TPM characteristics described herein.

The DAA simulator 316 in the TEE 312 is a simulated implementation of a DAA specifically designed and adapted to the TPM. The DAA is a remote identity authentication protocol used to verify a legal identity of the TPM. The DAA protocol is divided into three entities: a certificate issuer, a signer, and a signature verifier. The signer also includes a host and a TPM. The TPM prevents intrusion of illegal users, while the host is responsible for message transmission between the TPM and other entities and bears some computation tasks.

The DAA protocol is a special group signature protocol, which differs from general group signatures that have signature traceability and non-association (an administrator can reveal the true signer based on the signature). The DAA has flexible traceability and association because there is no authorizer (such as an administrator or other trusted third parties in the group) used to expose identities in the protocol. The DAA can provide a mechanism for user anonymity and user controllable association, making multiple predetermined signatures from the same signer associable to the same or multiple verifiers. In some embodiments of the present disclosure, the DAA simulator 316 can implement the characteristics of the DAA, which include but are not limited to the DAA characteristics described herein.

The cloud platform 302 can create a virtual shared resource pool and use a virtualization technology to create multiple virtual machines on a single server, so that separate operating systems and applications can be run for different clients on a physical server. It provides computation, data storage, and network services through the Internet, allowing enterprises to store, back up, and restore data; testing and building applications; accessing cloud databases; analyzing big datasets; delivering software on demand on a global scale; accessing business intelligence; and creating cloud native applications. Customers can access resources on the cloud platform 302 when needed and only pay for the resources they need.

The cloud platform 302 can be divided into a private cloud platform and a public cloud platform according to its service object classification, where the private cloud platform is a cloud computing environment exclusively for a single enterprise, which may be owned and managed by the enterprise or leased from a private cloud service provider; the public cloud platform is run by a cloud service provider (a third-party provider who owns and is responsible for managing and upgrading the hardware and software of the cloud platform), providing services to multiple clients through virtual machines located on the same physical server and isolated from each other. Both public and private cloud platforms can provide all the advantages of cloud computing, including one or more of: flexibility, so that enterprises can quickly expand and shrink their scales according to business needs, thereby avoiding the risk of excessive or insufficient configuration; low cost, allowing enterprises to avoid capital expenditures for establishing local data centers, while also avoiding IT labor costs due to related management work; strong performance, allowing enterprises to access all the computing capabilities and cloud storage space they need, and thus enabling them to have exceptional performance; high agility, providing on-demand resources that enable enterprises to deploy cloud infrastructures they truly need at any time, so as to accelerate innovation and the product launch speed; fast deployment, allowing enterprises to deploy the technologies they need anywhere in the world, and to complete the deployment in just a few minutes, rather than days, weeks, or even months; and strong security, excellent reliability, advanced mobility, etc.

In the embodiment shown in FIG. 3, when the IoT device 304 is powered on, the TPM simulator 314 also boots, thereby establishing an environment similar to the TPM in the TEE 312 to provide a secure running environment. In response to the boot of the TPM simulator 314, the DAA simulator 316 sends an access request to an application 310. The application 310 sends the received access request to the cloud platform 302. The cloud platform 302 delivers the access request to a supplier of the IoT device 304, and sends a response of the supplier to the application 310 after receiving the access request signed by the supplier. The application 310 sends the received response to the TEE 312 and executes a verification process for the IoT device 304 through the TPM simulator 314. The verification process includes a first verification process and a runtime verification process.

With this method, TPM services can be simulated in the TEE of IoT devices, thereby implementing DAA and corresponding verification processes to enable IoT devices with TEEs to achieve more secure verification processes even without TPM chips.

Figure 4:
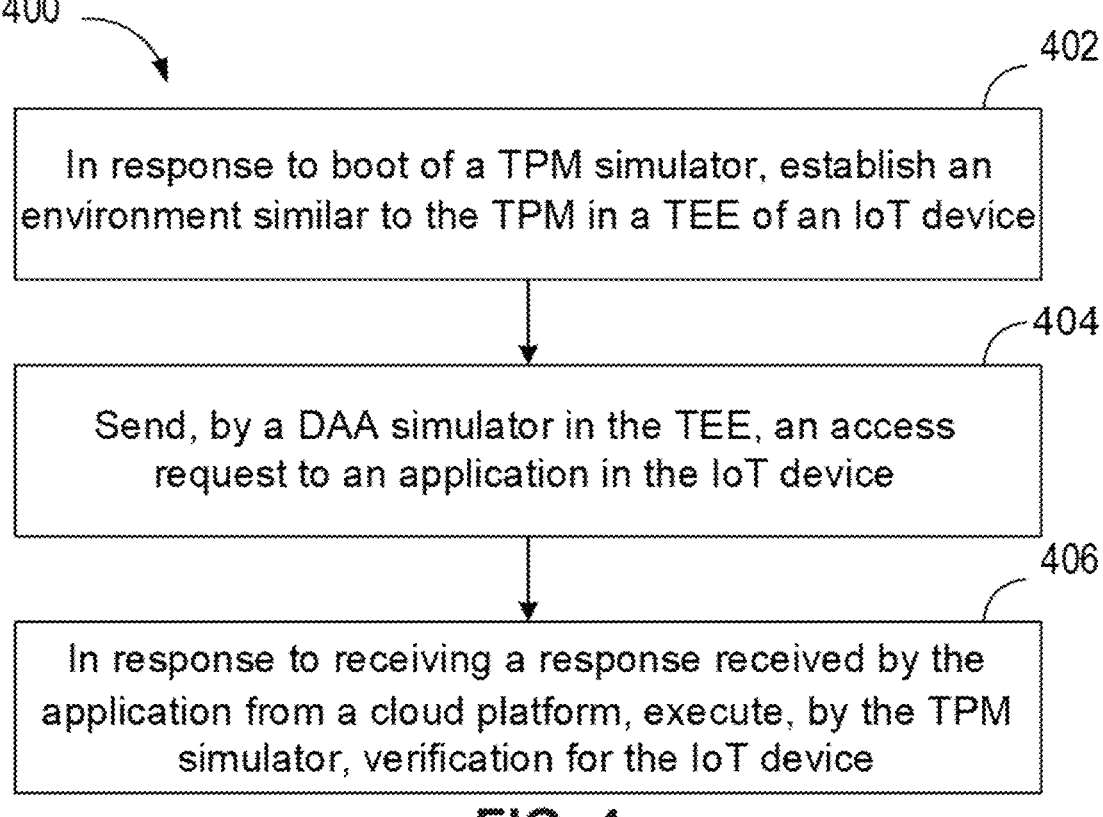
FIG. 4 shows a flowchart of a method for verifying an IoT device according to some embodiments of the present disclosure.

FIG. 4 shows a flowchart of a method 400 for verifying the IoT device 304 according to some embodiments of the present disclosure. The method 400 can be implemented in the environment 300 shown in FIG. 3. The numerals in the flowchart do not necessarily indicate the sequences in which these steps are executed. Some or all of these steps can be executed in parallel, or the execution sequences can be exchanged with each other, which is not limited in the present disclosure.

In block 402, in response to the boot of a TPM simulator, an environment similar to the TPM is established in a TEE of the IoT device.

In some embodiments, in response to the boot of the TPM simulator 314, an environment similar to the TPM is established in the TEE 312. In order to implement invoking of TPM commands, a processing program is introduced as a customized layer for processing business logic at a secure end of the TEE 312. The processing program receives an identifier from a client and finds a target service, then executes target codes composed of business logic and TPM commands, finally invokes the TPM simulator 314 in the TEE 312, submits the commands to a command entry of the TPM simulator 314, and obtains these TPM services. The TPM simulator 314 works as a trusted application on a trusted end of the TEE 312. When it receives a TPM command requested by the TEE 312, it passes the command to a command scheduling program, which searches a command descriptor table and finds the actual TPM command entry that will ultimately provide the service, and ultimately executes the TPM command. In this way, an environment that can execute TPM commands is implemented.

In block 404, the DAA simulator in the TEE sends the access request to the application in the IoT device.

In some embodiments, the DAA simulator 316 in the TEE 312 sends the access request to the application 310 in the IoT device 304. To implement the DAA simulator 316 in the TEE 312, TPM signature operations are marked based on an interface of the TPM simulator 314 by using the identifier TPM2_CC_Sign, and forwarding the identifier to the entry of the TPM simulator 314, thereby obtaining TPM signature services. The access request sent by the DAA simulator 316 is a request signed by the DAA simulator 316. During a signing process of the DAA simulator 316, a certificate publisher verifies the TPM simulator 314 and issues DAA credentials to it, and the credentials are verified through the signature verifier without attempting to compromise host privacy. Meanwhile, the DAA simulator 316 also supports a blacklist function, so that the signature verifier can identify the certificate from a compromised TPM simulator 314.

In block 406, in response to receiving a response received by the application from a cloud platform, the TPM simulator executes verification for the IoT device.

In some embodiments, in response to receiving a response received by the application 310 from the cloud platform 302, the TPM simulator 314 executes verification for the IoT device 304. The response is from the access request signed by the supplier of the IoT device 304, and the verification executed by the TPM simulator 314 includes a first verification and a runtime verification. The TPM simulator 314 acts as a trust root in the verification process, and establishes a trust chain for the verification process.

FIG. 5 shows a schematic diagram of a first verification process 500 for the IoT device 304 according to some embodiments of the present disclosure. As shown in FIG. 5, the first verification process 500 involves four execution entities, including a supplier device 502, a cloud platform 504, a terminal user application 506, and an IoT device 508. The supplier device 502, the terminal user application 506, and the IoT device 508 respectively interact with the cloud platform 504. The terminal user application 506 includes a verification interface 506-1, the cloud platform 504 includes a verification agent 504-1 and a zero trust interface 504-2, the verification agent 504-1 is used to transmit and verify relevant information, and the zero trust interface 504-2 is used to provide zero trust support in a runtime verification process. The supplier device 502 includes a verification interface 502-1, and the IoT device 508 includes hardware-based security label generation 508-1, an operating system 508-2, a TEE 508-3, and firmware 508-4.

The supplier device 502 is a supplier device of the IoT device 508, including a distributor device and a manufacturer device. The distributor device can be a laptop, a server, etc. used to record sales transactions of the IoT device 508, where the sales transactions include a manufacturer identifier, a distributor identifier, and identifiers of a purchaser and the IoT device 508. From the sales transactions recorded through the distributor device, the manufacturer, the distributor, the IoT device 508, and the purchaser can be linked together; and the purchaser is the user. The sales transaction can be used for subsequent tracing of the IoT device 508 by the user. The manufacturer device can be a laptop, a server, etc. used to enable the manufacturer to write a registration transaction of the IoT device 508 into a blockchain after the production and assembly of the IoT device 508 is completed. The registration transaction includes a globally unique device identifier of the IoT device and basic information of the IoT device (such as the manufacturer identifier, the model, etc.).

In the embodiment shown in FIG. 5, the terminal user application 506 first registers the IoT device 508 to the cloud platform 504. After receiving an access request from the IoT device 508, the cloud platform 504 forwards the access request to the supplier device 502, where the access request contains hardware information of the IoT device 508. The supplier device 502 receives, through the verification interface 502-1, the access request sent by the cloud platform 504. After signing the access request, its response is sent to the cloud platform 504 via the verification interface 502-1. The cloud platform 504 forwards the response to the IoT device 508. After receiving the response, the IoT device 508 has a private key of a DAA signature registered to the supplier device 502. Then, the IoT device 508 sends a first verification configuration request for the configuration of the IoT device 508, an identity of the application, and a PCR value signed by using the private key to the cloud platform 504. The cloud platform 504 sends the first verification configuration request to the terminal user application 506. After receiving the request via verification interface 506-1, the terminal user application 506 verifies the firmware 508-4, the operating system 508-2, and the application in the IoT device 508 based on the PCR value. After verification for the terminal user application 506 is completed, the first verification configuration and the first verification information are sent to the cloud platform 504 via the verification interface 506-1. The cloud platform 504 sends the first verification configuration to the IoT device 508. Finally, the IoT device 508 applies the first verification configuration on the application, and the first verification is completed.

Figure 6:
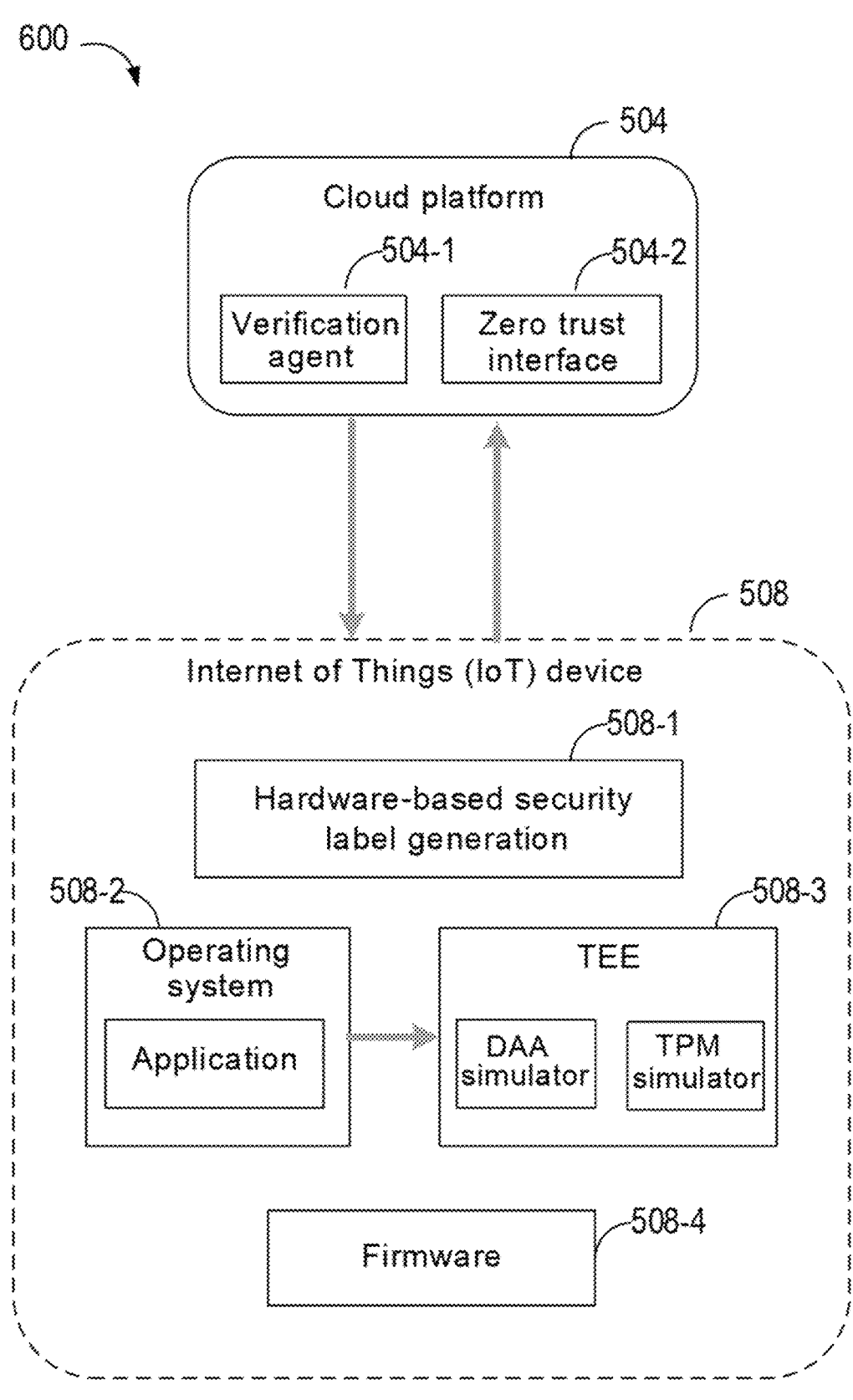
FIG. 6 shows a schematic diagram of a runtime verification process for an IoT device according to some embodiments of the present disclosure.

FIG. 6 shows a schematic diagram of a runtime verification process 600 of an IoT device according to some embodiments of the present disclosure. As shown in FIG. 6, the runtime verification process 600 involves two execution entities, including the cloud platform 504 and the IoT device 508.

As shown in FIG. 6, the cloud platform 504 sends a verification request to the IoT device 508, and the verification request includes one or more of a data verification request, a device verification request, and a program verification request. For the data verification request, the TPM simulator establishes a secure channel between the IoT device 508 and the cloud platform 504 by using a key generated in the TPM simulator; for the device verification request, the IoT device 508 sends a PCR value signed by the DAA simulator to the cloud platform 504; and for the program verification request, the IoT device 508 sends a hash code of the application signed by the DAA simulator to the cloud platform 504.

With the embodiments shown in FIG. 5 and FIG. 6, mechanisms and flows for security verification for IoT devices are provided, and these flows aim to simulate, in the TEE, required TPM security services for IoT devices that do not have TPMs but have TEEs, thereby minimizing the exposure of user privacy information while completing the verification and ensuring the security of the verification process.

Figure 7:
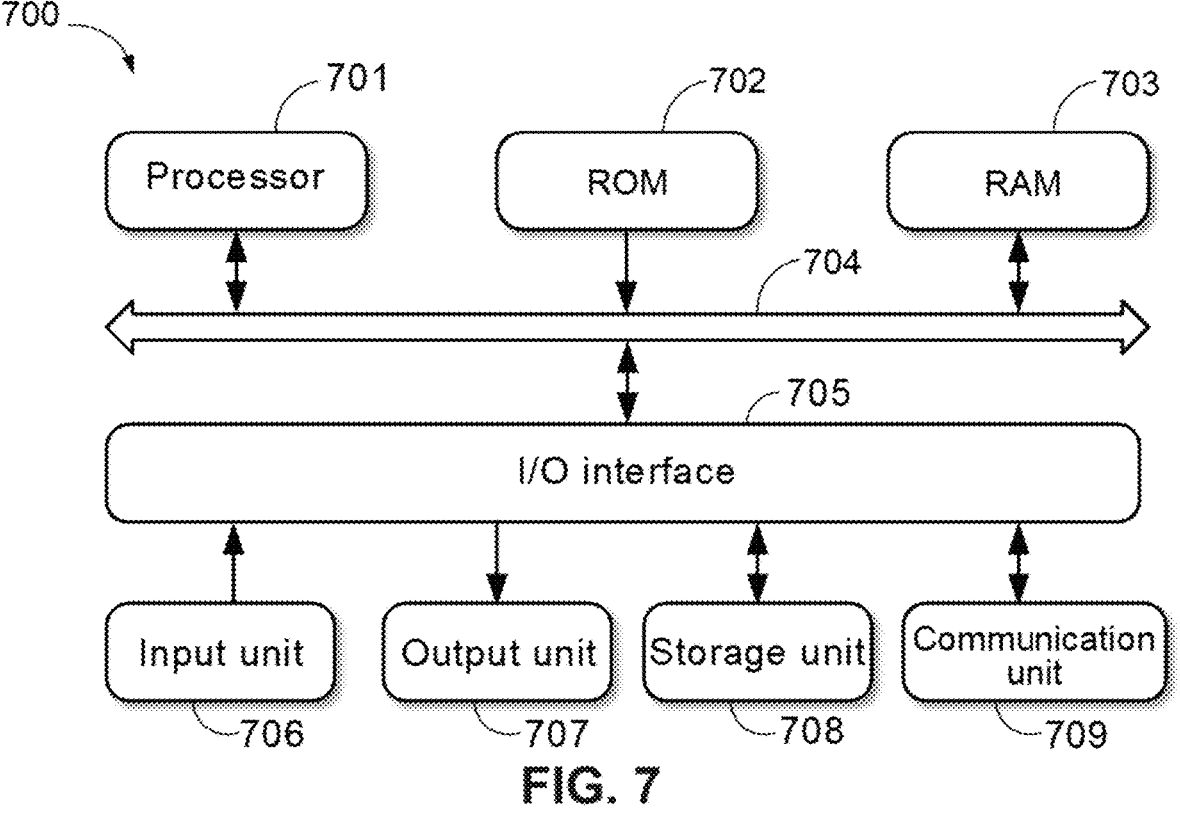
FIG. 7 shows a block diagram of an example device for implementing embodiments of the present disclosure.

FIG. 7 shows a block diagram of an example device 700 for implementing embodiments of the present disclosure. As shown in the figure, the device 700 includes a processor 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The processor 701, the ROM 702, and the RAM 703 are connected to each other via a bus 704. An input/output (I/O) interface 705 is also connected to the bus 704.

Multiple components in the device 700 are connected to the I/O interface 705, including: an input unit 706, such as a keyboard and a mouse; an output unit 707, such as various types of displays and speakers; the storage unit 708, such as a magnetic disk, an optical disc, and the like; and a communication unit 709, such as a network card, a modem, and a wireless communication transceiver. The communication unit 709 allows the device 700 to exchange information/data with other devices via a computer network, such as the Internet, and/or various telecommunication networks.

The processor 701 may be various general-purpose and/or special-purpose processing components with processing and computing capabilities. Some examples of the processor 701 include, but are not limited to, central processing units (CPUs), graphics processing units (GPUs), various specialized artificial intelligence (AI) computing chips, various processors for running machine learning model algorithms, digital signal processors (DSPs), and any appropriate processors, controllers, microcontrollers, etc. The processor 701 performs various methods and processes described above, such as the method 400. For example, in some embodiments, the method 400 may be implemented as a computer software program that is tangibly included in a machine readable medium, such as the storage unit 708. In some embodiments, part or all of the computer program may be loaded and/or installed onto the device 700 via the ROM 702 and/or the communication unit 709. When the computer program is loaded onto the RAM 703 and executed by the processor 701, one or more steps of the method 400 described above may be performed. Alternatively, in other embodiments, the processor 701 may be configured to perform the method 400 by any other suitable manners (e.g., by means of firmware).

The functions described herein may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program codes for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flowcharts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should not be construed as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these are not to be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for verifying an Internet of Things (IoT) device, wherein the method comprises:

in response to boot of a trusted platform module (TPM) simulator, establishing a simulated TPM environment in a trusted execution environment (TEE) of the IoT device, wherein the TPM simulator is deployed in the TEE of the IoT device;

sending, by a direct anonymous attestation (DAA) simulator in the TEE, an access request to an application in the IoT device, wherein the application sends the access request to a cloud platform and receives a response from the cloud platform; and in response to receiving in the simulated TPM environment at least a portion of the response received by the application from the cloud platform, executing, by the TPM simulator, verification for the IoT device;

wherein executing the verification for the IoT device comprises executing runtime verification of the IoT device utilizing the simulated TPM environment based on a verification request from the cloud platform; and wherein the runtime verification comprises one or more of (i) establishing secure communication between the IoT device and the cloud platform based on a key implemented in the simulated TPM environment, (ii) sending one or more platform configuration register values signed by the DAA simulator from the IoT device to the cloud platform, and (iii) sending application code information signed by the DAA simulator from the IoT device to the cloud platform.

2. The method according to claim 1, wherein the response received from the cloud platform is from an operation of a supplier device, and the operation comprises:

in response to receiving the access request of the cloud platform, signing, by the supplier device, the access request and sending, by the supplier device, its response to the cloud platform.

3. The method according to claim 1, wherein executing, by the TPM simulator, verification for the IoT device comprises:

in response to receiving the response from the cloud platform, obtaining, by the IoT device, a private key of a DAA signature registered to a supplier device;

sending, by the IoT device, a first verification configuration request for the configuration of the IoT device, an identity of the application, and a platform configuration register (PCR) value signed by using the private key to the cloud platform; and in response to receiving a first verification configuration from the cloud platform, applying, by the IoT device, the first verification configuration on the application.

4. The method according to claim 3, wherein the first verification configuration from the cloud platform is from an operation of a terminal user application, and the operation comprises:

in response to receiving the first verification configuration request from the cloud platform, verifying, by the terminal user application based on the PCR value, firmware, an operating system, and the application in the IoT device; and sending, by the terminal user application, the first verification configuration and first verification information to the cloud platform.

5. The method according to claim 1, further comprising:

in response to receiving a verification request received by the application from the cloud platform, executing, by the TPM simulator, runtime verification for the IoT device.

6. The method according to claim 5, wherein the verification request comprises one or more of a data verification request, a device verification request, and a program verification request.

7. The method according to claim 6, wherein executing, by the TPM simulator, runtime verification for the IoT device comprises:

in response to the data verification request, establishing, by the TPM simulator, a secure channel between the IoT device and the cloud platform by using a key generated in the TPM simulator;

in response to the device verification request, sending, by the IoT device, a platform configuration register value signed by the DAA simulator to the cloud platform; and in response to the program verification request, sending, by the IoT device, a hash code of the application signed by the DAA simulator to the cloud platform.

8. An electronic device, wherein the electronic device comprises:

at least one processor; and memory coupled to the at least one processor and having instructions stored therein, the instructions, when executed by the at least one processor, causing the electronic device to perform actions comprising:

in response to boot of a trusted platform module (TPM) simulator, establishing a simulated TPM environment in a trusted execution environment (TEE) of an Internet of Things (IoT) device, wherein the TPM simulator is deployed in the TEE of the IoT device;

sending, by a direct anonymous attestation (DAA) simulator in the TEE, an access request to an application in the IoT device, wherein the application sends the access request to a cloud platform and receives a response from the cloud platform; and in response to receiving in the simulated TPM environment at least a portion of the response received by the application from the cloud platform, executing, by the TPM simulator, verification for the IoT device;

wherein executing the verification for the IoT device comprises executing runtime verification of the IoT device utilizing the simulated TPM environment based on a verification request from the cloud platform; and wherein the runtime verification comprises one or more of (i) establishing secure communication between the IoT device and the cloud platform based on a key implemented in the simulated TPM environment, (ii) sending one or more platform configuration register values signed by the DAA simulator from the IoT device to the cloud platform, and (iii) sending application code information signed by the DAA simulator from the IoT device to the cloud platform.

9. The electronic device according to claim 8, wherein the response received from the cloud platform is from an operation of a supplier device, and the operation comprises:

in response to receiving the access request of the cloud platform, signing, by the supplier device, the access request and sending, by the supplier device, its response to the cloud platform.

10. The electronic device according to claim 8, wherein executing, by the TPM simulator, verification for the IoT device comprises:

in response to receiving the response from the cloud platform, obtaining, by the IoT device, a private key of a DAA signature registered to a supplier device;

sending, by the IoT device, a first verification configuration request for the configuration of the IoT device, an identity of the application, and a platform configuration register (PCR) value signed by using the private key to the cloud platform; and in response to receiving a first verification configuration from the cloud platform, applying, by the IoT device, the first verification configuration on the application.

11. The electronic device according to claim 10, wherein the first verification configuration from the cloud platform is from an operation of a terminal user application, and the operation comprises:

in response to receiving the first verification configuration request from the cloud platform, verifying, by the terminal user application based on the PCR value, firmware, an operating system, and the application in the IoT device; and sending, by the terminal user application, the first verification configuration and first verification information to the cloud platform.

12. The electronic device according to claim 8, wherein the actions further comprise:

in response to receiving a verification request received by the application from the cloud platform, executing, by the TPM simulator, runtime verification for the IoT device.

13. The electronic device according to claim 12, wherein the verification request comprises one or more of a data verification request, a device verification request, and a program verification request.

14. The electronic device according to claim 13, wherein executing, by the TPM simulator, runtime verification for the IoT device comprises:

in response to the data verification request, establishing, by the TPM simulator, a secure channel between the IoT device and the cloud platform by using a key generated in the TPM simulator;

in response to the device verification request, sending, by the IoT device, a platform configuration register value signed by the DAA simulator to the cloud platform; and in response to the program verification request, sending, by the IoT device, a hash code of the application signed by the DAA simulator to the cloud platform.

15. A computer program product comprising a non-transitory computer-readable medium having machine-executable instructions stored therein, wherein the machine-executable instructions, when executed by a machine, cause the machine to execute actions comprising:

in response to boot of a trusted platform module (TPM) simulator, establishing a simulated TPM environment in a trusted execution environment (TEE) of an Internet of Things (IoT) device, wherein the TPM simulator is deployed in the TEE of the IoT device;

sending, by a direct anonymous attestation (DAA) simulator in the TEE, an access request to an application in the IoT device, wherein the application sends the access request to a cloud platform and receives a response from the cloud platform; and in response to receiving in the simulated TPM environment at least a portion of the response received by the application from the cloud platform, executing, by the TPM simulator, verification for the IoT device;

wherein executing the verification for the IoT device comprises executing runtime verification of the IoT device utilizing the simulated TPM environment based on a verification request from the cloud platform; and wherein the runtime verification comprises one or more of
(i) establishing secure communication between the IoT device and the cloud platform based on a key implemented in the simulated TPM environment, (ii) sending one or more platform configuration register values signed by the DAA simulator from the IoT device to the cloud platform, and (iii) sending application code information signed by the DAA simulator from the IoT device to the cloud platform.

16. The computer program product according to claim 15, wherein the response received from the cloud platform is from an operation of a supplier device, and the operation comprises:

in response to receiving the access request of the cloud platform, signing, by the supplier device, the access request and sending, by the supplier device, its response to the cloud platform.

17. The computer program product according to claim 15, wherein executing, by the TPM simulator, verification for the IoT device comprises:

in response to receiving the response from the cloud platform, obtaining, by the IoT device, a private key of a DAA signature registered to a supplier device;

sending, by the IoT device, a first verification configuration request for the configuration of the IoT device, an identity of the application, and a platform configuration register (PCR) value signed by using the private key to the cloud platform; and in response to receiving a first verification configuration from the cloud platform, applying, by the IoT device, the first verification configuration on the application.

18. The computer program product according to claim 17, wherein the first verification configuration from the cloud platform is from an operation of a terminal user application, and the operation comprises:

in response to receiving the first verification configuration request from the cloud platform, verifying, by the terminal user application based on the PCR value, firmware, an operating system, and the application in the IoT device; and sending, by the terminal user application, the first verification configuration and first verification information to the cloud platform.

19. The computer program product according to claim 15, wherein the actions further comprise:

in response to receiving a verification request received by the application from the cloud platform, executing, by the TPM simulator, runtime verification for the IoT device.

20. The computer program product according to claim 15, wherein executing, by the TPM simulator, runtime verification for the IoT device comprises:

in response to a data verification request, establishing, by the TPM simulator, a secure channel between the IoT device and the cloud platform by using a key generated in the TPM simulator;

in response to a device verification request, sending, by the IoT device, a platform configuration register value signed by the DAA simulator to the cloud platform; and in response to a program verification request, sending, by the IoT device, a hash code of the application signed by the DAA simulator to the cloud platform.

* * * * *